(12) United States Patent
Parker

(10) Patent No.: US 11,231,530 B1
(45) Date of Patent: Jan. 25, 2022

(54) ETCHED ILLUMINATED DISPLAY

(71) Applicant: Joel B. Parker, Brooklyn, NY (US)

(72) Inventor: Joel B. Parker, Brooklyn, NY (US)

(*) Notice: Subject to any disclaimer, the term of this patent is extended or adjusted under 35 U.S.C. 154(b) by 60 days.

(21) Appl. No.: 16/548,123

(22) Filed: Aug. 22, 2019

(51) Int. Cl.
  G09F 13/12 (2006.01)
  G02B 5/08 (2006.01)
  F21S 4/24 (2016.01)

(52) U.S. Cl.
  CPC .......... *G02B 5/08* (2013.01); *F21S 4/24* (2016.01); *G09F 13/12* (2013.01)

(58) Field of Classification Search
  CPC ........................................... G09F 13/12
  USPC ................................. 40/219; 362/367
  See application file for complete search history.

(56) References Cited

U.S. PATENT DOCUMENTS

| | | | | |
|---|---|---|---|---|
| 3,876,293 A * | 4/1975 | Ramos | ............... | F21V 33/004 359/630 |
| 5,199,202 A * | 4/1993 | Musgrave | ............... | G09F 13/12 40/219 |
| 5,863,109 A * | 1/1999 | Hsieh | ............... | F21S 10/00 362/235 |
| 6,231,196 B1 * | 5/2001 | Mahachek | ............... | G02B 5/08 359/15 |
| 6,394,627 B1 * | 5/2002 | Lo | ............... | A47G 21/14 362/127 |
| 6,543,163 B1 | 4/2003 | Ginsberg | | |
| 7,204,618 B1 * | 4/2007 | Kuelbs | ............... | F21S 9/037 362/35 |
| 7,805,260 B2 * | 9/2010 | Mischel, Jr | ............... | G09F 19/14 348/826 |
| 8,419,236 B2 * | 4/2013 | Fisher | ............... | A47B 13/12 362/249.02 |
| 2002/0048099 A1 * | 4/2002 | Lang | ............... | B60R 1/08 359/870 |
| 2003/0146735 A1 * | 8/2003 | Barbeau | ............... | F21L 2/00 320/114 |
| 2008/0143890 A1 * | 6/2008 | Rosencwaig | .... | H04N 21/42202 348/836 |
| 2010/0296298 A1 * | 11/2010 | Martin, Jr. | ........... | A47G 1/0622 362/311.06 |
| 2015/0009665 A1 * | 1/2015 | Durkee | ............... | G04B 47/02 362/231 |

OTHER PUBLICATIONS (MLS-450-34 3 line Illuminated mirror with warm white LED Sign). Product Listing [online]. Copyright © 2011 Sign96.com Sign Ninety Six Resources [retrieved on Dec. 13, 2018], Retrieved from the Internet: <URL: http://sign96.com/product_info_704001-100739.htm>.

(Continued)

*Primary Examiner* — Gary C Hoge
(74) *Attorney, Agent, or Firm* — Cramer Patent & Design, PLLC; Aaron R. Cramer

(57) ABSTRACT

An etched illuminated display includes a mirrored first surface having etched indicia thereon. A second and a third surface are disposed along a first and a second outer edge of the mirrored first surface. An illumination source is positioned behind the first surface. When activated the illumination source produces illumination emanating from the etched indicia.

11 Claims, 5 Drawing Sheets

(56) References Cited

OTHER PUBLICATIONS

Etched Glass Signs & Logos. Product Listing [online]. © 2016 Krystal Glass Company, Inc. [retrieved on Dec. 13, 2018]. Retrieved from the Internet: <URL: https://www.krystalglasscompany.com/services/etched-glass-signs/>.

Modern Frameless Finely Etched Back Illuminated Glazz Cosmic Bathroom Mirror. Product Listing [online], © 1stdibs, Inc. 2019 [retrieved on Dec. 13, 2018]. Retrieved from the Internet: <URL: https://www.1stdibs.com/furniture/mirrors/wall-mirrors/modern-frameless-finely-etched-back-illuminated-glazz-cosmic-bathroom-mirror/id-f_7743653/>.

Estrella Mirror, Finely Etched Pattern Back-Illuminated with Black Frame. Product Listing [online]. © 1stdibs, Inc. 2019 [retrieved on Dec. 13, 2018]. Retrieved from the Internet: <URL: https://www.1stdibs.com/furniture/mirrors/wall-mirrors/estrella-mirror-finely-etched-pattern-back-illuminated-black-frame/id-f_8832983/>.

Iluminated Glass. Product Listing [online], © 2016 Krystal Glass Company, Inc [retrieved on Dec. 13, 2018], Retrieved from the Internet: <URL: https://www.krystalglasscompany.com/services/illuminated-glass/>.

* cited by examiner

ETCHED ILLUMINATED DISPLAY

RELATED APPLICATIONS

Not applicable.

FIELD OF THE INVENTION

The present invention relates generally to an illuminated display and specifically to an illuminated display having a religious message.

BACKGROUND OF THE INVENTION

People of deep, whole-hearted religious faith live by and are inspired by the word of God and the Lord Jesus Christ. These people typically involve themselves in intensive study of the Bible and strive to follow its teachings. While these efforts often produce positive results where true happiness and content is realized, as mortals we inevitably venture off a desired spiritual path without constant reminders of our faith. Others may require more traditional messages or inspiration that is just not delivered by conventional prayer or spiritual poem.

As believers in the Word of God, people are on the constant lookout for new and inspirational methods of presenting such reminders. Accordingly, there exists a need for a means by which inspirational messages and/or biblical verse reminders can be delivered in a new and exciting manner. The development of the Etched Illuminated Display fulfills this need.

SUMMARY OF THE INVENTION

The principles of the present invention provide for an engraved mirror, comprising a main front mirror which is provided with an inscribed indicia and a plurality of beveled edges. The main front mirror which is inscribed with indicia is produced on a rear surface of the main front mirror. The engraved mirror also comprises a left-side mirror which is provided with an inscribed indicia and a plurality of beveled edges. The left-side mirror which is inscribed with indicia is produced on a rear surface of the left-side mirror. The engraved mirror also comprises a right-side mirror which is provided with an inscribed indicia and a plurality of beveled edges. The right-side mirror with inscribed indicia is produced on a rear surface of the right-side mirror.

The engraved mirror also comprises a top cap which is disposed on a top of the engraved mirror, a bottom cap which is disposed a bottom of the engraved mirror, a rear surface which is disposed on a rear of the engraved mirror, an in-line switch which has an ON/OFF switch—the in-line switch is provided to control electrical power to the engraved mirror, a physical junction between the top cap and the rear surface, the bottom cap and the rear surface, the left side mirror and the rear surface, and the right side mirror and the rear surface, an electric power cord and an electrical plug providing electrical power to the engraved mirror—the electric power cord exits through the rear surface to be minimally visually intrusive, a plurality of interior illumination is provided by a pair of LED light strips attached to the top cap and the bottom cap, and a colored film which is located adjacent to an interior of the left side mirror, an interior of the right-side mirror as well as an interior of the front mirror to allow for a colored appearance of the inscribed indicia.

The main front mirror may include four support blocks which are attached by adhesive. The main front mirror may present a smooth surface to the viewer that is easy to keep clean and free of dust. The main front mirror may be inscribed indicia are accomplished by a process selected from the group consisting of laser etching, chemical etching, or mechanical etching. The left-side mirror may present a smooth surface to the viewer that is easy to keep clean and free of dust. The left-side mirror inscribed indicia are accomplished by a process selected from the group consisting of laser etching, chemical etching, or mechanical etching. The right-side mirror may also present a smooth surface to the viewer that is easy to keep clean and free of dust.

The right-side mirror which is inscribed indicia may be accomplished by a process selected from the group consisting of laser etching, chemical etching, or mechanical etching. The top and bottom caps may be made of wood. An outward facing surface of the rear surface may be provided with a protective coating to provide an aesthetic ambiance should the engraved mirror be displayed in a manner which allows viewing of the rear surface. The rear surface may be made of wood and may be one-eighth-of-an-inch thick. The electric power cord may be transparent to be minimally visually intrusive.

The pair of LED light strips may be electrically connected to each other via interconnecting electrical wiring as well as to a one-amp LED power supply. The one-amp LED power supply may receive input power from the electric power cord. An interior side of the rear surface may be covered with a reflective coating to aid in light distribution from the LED light strips about an interior of the engraved mirror. The engraved mirror may be sixteen inches wide, sixteen inches tall, and two and three-quarters inches deep.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
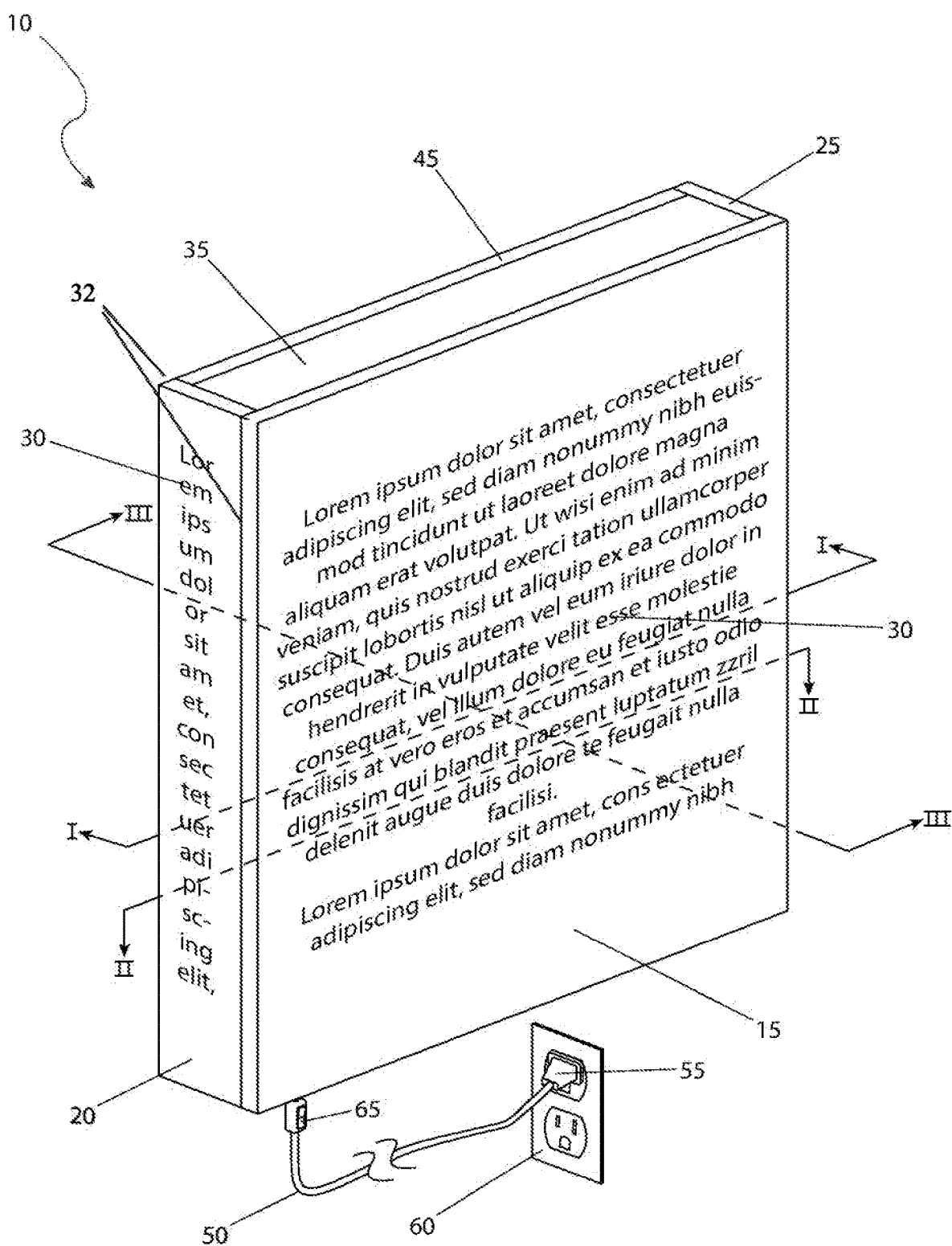
FIG. 1 is a perspective view of the engraved mirror 10, according to the preferred embodiment of the present invention.

DESCRIPTIVE KEY 10 engraved mirror
15 front mirror
20 left side mirror
25 right side mirror
30 inscribed indicia
32 beveled edges
35 top cap
40 bottom cap 45 rear surface
50 electric power cord
55 plug
60 receptacle
65 in-line switch
70 support block
72 adhesive
75 light strip
80 interconnecting wiring
85 power supply
90 reflective coating

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a front view of the engraved mirror with interior lighting 10, according to the preferred embodiment of the present invention is disclosed. The engraved mirror 10 (herein also described as the "mirror") 10, includes a main front mirror 15, a left side mirror 20, and a right-side mirror 25. Each of these is provided with inscribed indicia 30, as well as beveled edges 32. The inscribed indicia 30 is envisioned to be produced on the rear (i.e., interior) surface of each mirror, so as to present a smooth surface to the viewer, that is easy to keep clean and free of dust. The inscribing may be accomplished by laser etching, chemical etching, mechanical etching or the like. The particular type, style, and content of the inscribed indicia 30 is not intended to be a limiting factor of the present invention. Further description on the inscribed indicia 30 will be provided herein below. It is envisioned that the mirror 10 would have the approximate dimensions of sixteen inches (16 in.) wide, sixteen inches (16 in.) tall, and two and three-quarters inches (2¾ in.) deep. However, those skilled in the art will realize that the teachings of the present invention allow for both smaller and larger sizes as well. As such, the dimensions associated with the mirror 10 is not intended to be a limiting factor of the present invention. The mirror 10 is also provided with a top cap 35 and a bottom cap 40 (not shown due to illustrative limitations), envisioned to be made of wood.

A rear surface 45, envisioned to be made of wood that is approximately one-eighth-of-an-inch (⅛ in.) thick, is partially visible comprising the rear of the mirror 10 which is not normally visible to the viewer. Further description of the rear surface 45 will be provided herein below. The mirror 10 is powered by AC power through an electric power cord 50 and a plug 55 which connect to a conventional receptacle 60. The electric power cord 50 is envisioned to be of a clear color so as to be minimally visually intrusive and preferably exit through the rear surface 45. An in-line switch 65, functioning as an ON/OFF switch is provided to control power to the mirror 10. The mirror 10 is suitable for hanging on a wall or placement on a horizontal surface such as a desktop, countertop, fireplace mantle, cabinet, shelf, or the like. The exact method of display of the mirror 10 is not intended to be a limiting factor of the present invention.

Figure 2:
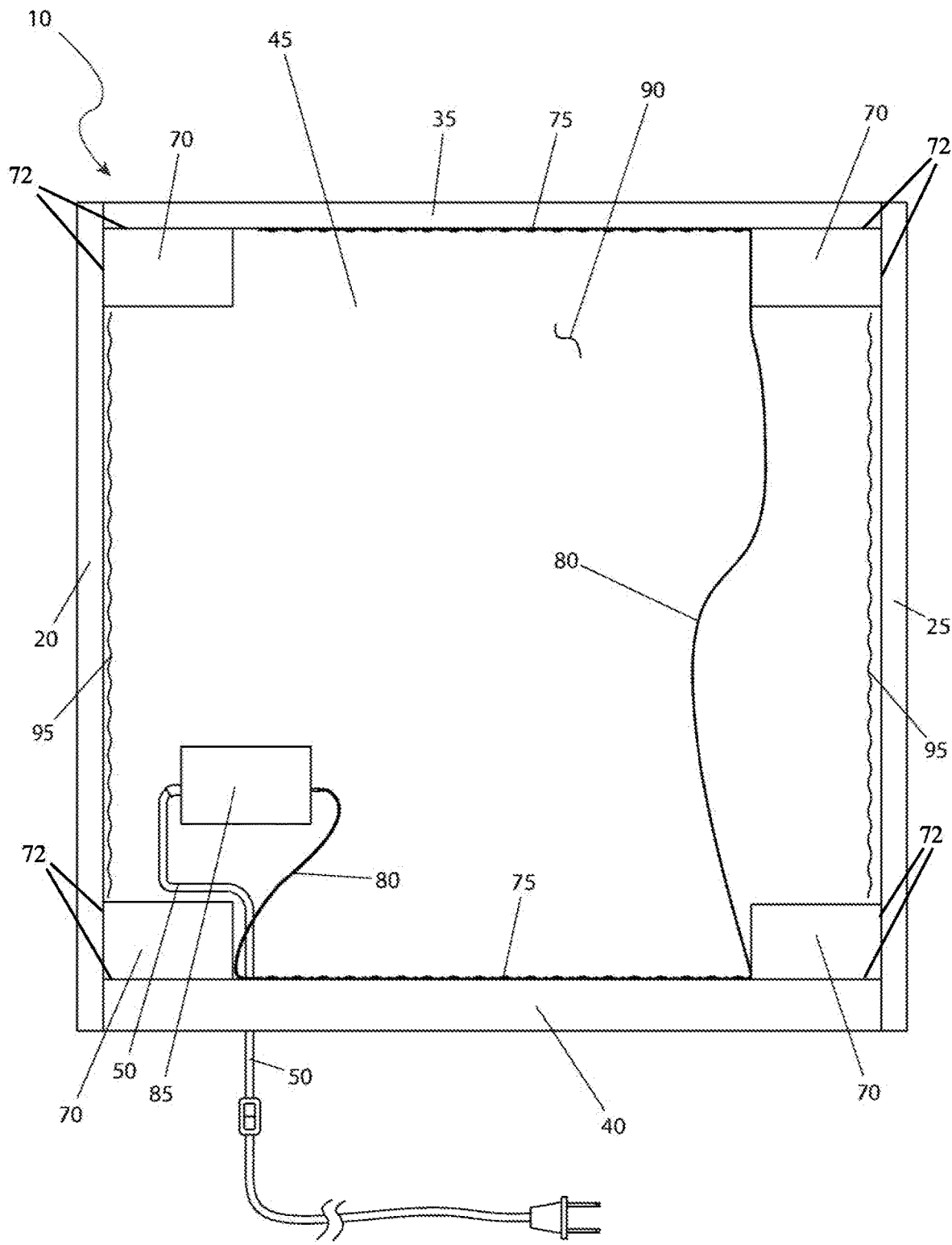
FIG. 2 is a sectional view of the engraved mirror 10, as seen along a line I-I, as shown in FIG. 1, according to the preferred embodiment of the present invention.

Referring next to FIG. 2, a sectional view of the mirror 10, as seen along a line I-1, as shown in FIG. 1, according to the preferred embodiment of the present invention is depicted. This view primarily portrays the interior surface of the rear surface 45. It is bordered by the left side mirror 20 and right-side mirror 25 on the left- and right-hand sides respectively and the top cap 35 and the bottom cap 40 on the top and bottom respectively. The physical junction between the top cap 35 and the rear surface 45, the bottom cap 40 and the rear surface 45, the left side mirror 20 and the rear surface 45, the right side mirror 25 and the rear surface 45, and the front mirror 15 (not shown due to illustrative limitations) is aided by the use of four (4) support block(s) 70 attached by adhesive 72. Interior illumination is provided by two (2) LED light strips 75 attached to the top cap 35 and the bottom cap 40. They are electrically connected to each other via interconnecting wiring 80 as well as to a one (1) amp LED power supply 85. The LED power supply 85 receives input power from the electric power cord 50, as aforementioned described. The interior side of the rear surface 45 is covered with a reflective coating 90, such as white paint, to aid in light distribution from the LED light strips 75 about the interior of the mirror 10. Finally, the mirror 10 may utilized colored film 95 located immediately adjacent to the interior of the left side mirror 20, the right-side mirror 25 as well as the front mirror 15 (not shown in this FIGURE, due to illustrative limitations). Said colored film 95 allows for the colored appearance of the inscribed indicia 30 (as shown in FIG. 1) to viewers. It is also envisioned that the colored appearance may be provided by the use of colored, or color changing LED's in the LED light strips 75, or by the use of ink or dye placed into the inscribed indicia 30. The exact method of imparting color to the inscribed indicia 30 is not intended to be a limiting factor of the present invention.

Figure 3:
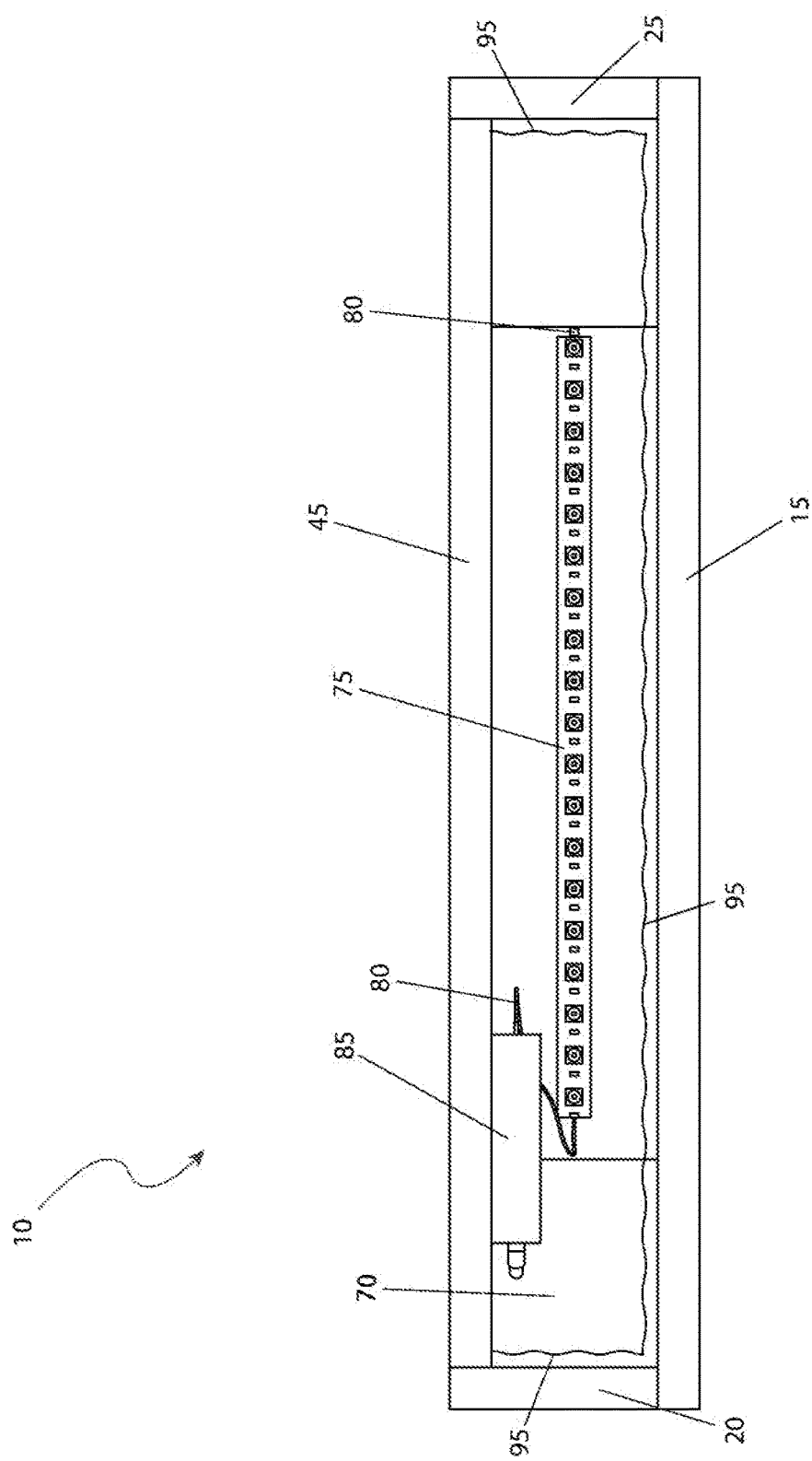
FIG. 3 is a sectional view of the engraved mirror 10, as seen along a line II-II, as shown in FIG. 1, according to the preferred embodiment of the present invention.

Referring now to FIG. 3, a sectional view of the engraved mirror with interior lighting 10, as seen along a line II-II, as shown in FIG. 1, according to the preferred embodiment of the present invention is shown. Said FIGURE clearly indicates the lower of the LED light strips 75 as well as two (2) of the four (4) support block(s) 70, along with the LED power supply 85. All three (3) pieces of the colored film 95 are also visible as they impart a colored view to the inscribed indicia 30 (as shown in FIG. 1) located on the front mirror 15, the left side mirror 20, and the right-side mirror 25.

Figure 4:
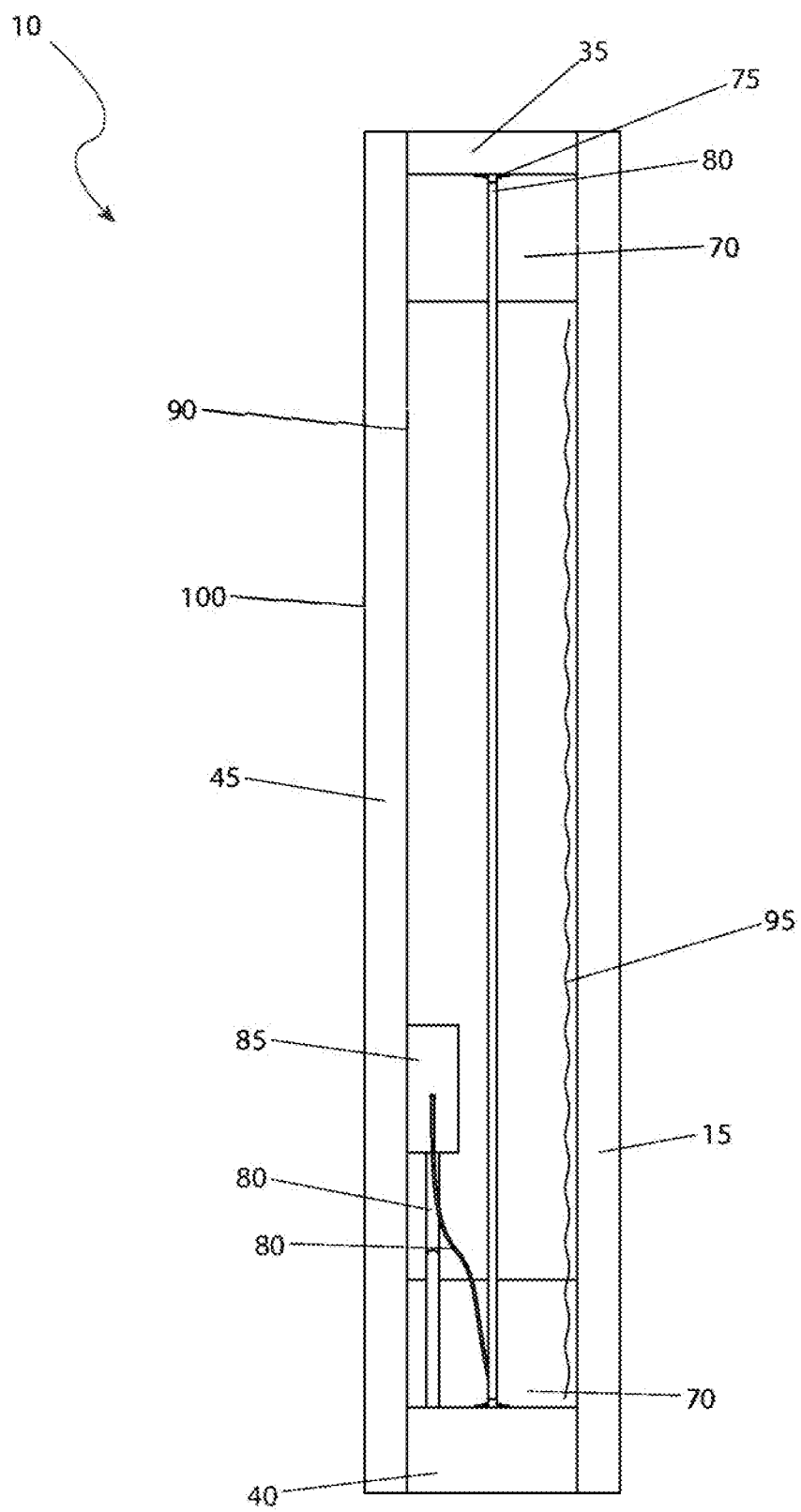
FIG. 4 is a sectional view of the engraved mirror 10, as seen along a line III-III, as shown in FIG. 1, according to the preferred embodiment of the present invention; and, FIG. 5 is an electrical block diagram of the engraved mirror 10, according to the preferred embodiment of the present invention.

Referring next to FIG. 4, a sectional view of the engraved mirror with interior lighting 10, as seen along a line III-III, as shown in FIG. 1, according to the preferred embodiment of the present invention is disclosed. Said view discloses both of the LED light strips 75 fastened to the top cap 35 and the rear surface 45, along with the interconnecting wiring 80 between them and the LED power supply 85. This view also depicts one (1) of the three (3) pieces of the colored film 95 as it imparts a colored view to the inscribed indicia 30 (as shown in FIG. 1) located on the front mirror 15. Finally, the rear (outward facing) surface of the rear surface 45 is provided with a protective coating 100, such as semi-gloss silver paint to provide an aesthetic ambiance, should the mirror 10 be displayed in a manner which allows viewing of the rear surface 45 under some situations. Additionally, the protective coating 100 as well as the reflective coating 90 protect the and preserve the rear surface 45. The rear surface 45 is attached to the four (4) support block(s) 70 (of which only two (2) are visible due to illustrative limitations) via use of adhesive. Said method of attachment is permanent, as there are no user serviceable components inside of the mirror 10.

Figure 5:
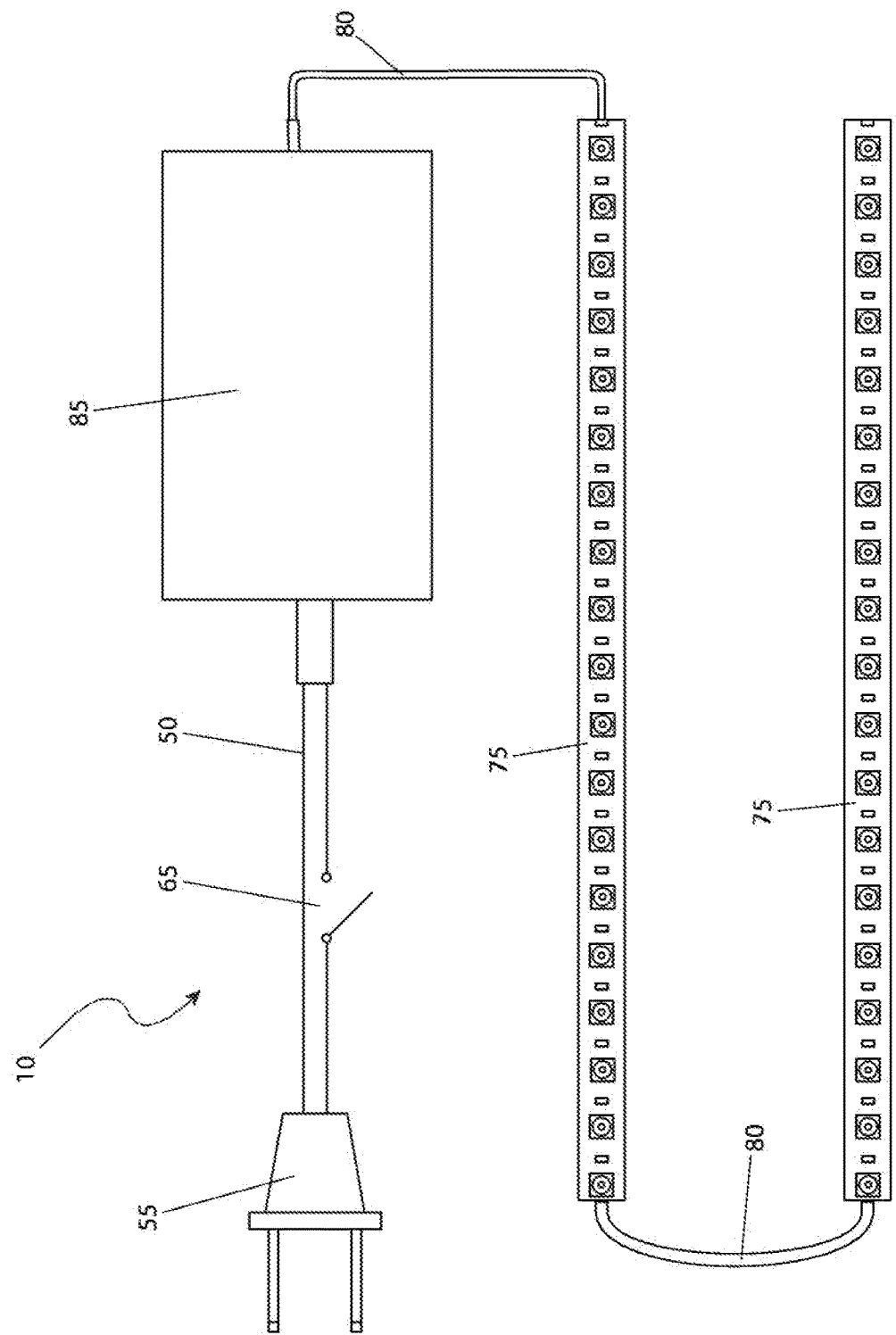

Referring finally to FIG. 5, an electrical block diagram of the engraved mirror with interior lighting 10, according to the preferred embodiment of the present invention is depicted. Electrical power is derived from the receptacle 60 (as shown in FIG. 1) and delivered through the plug 55, where it is controlled (ON/OFF) via the in-line switch 65. The electric power cord 50 then carries the electrical current to the LED power supply 85, where it is reduced in both voltage and current to power the LED light strips 75. Said resultant power is delivered by the interconnecting wiring 80 using a parallel circuit arrangement. Those skilled in the art will realized that other methods of electrical illumination are possible, including but not limited to, battery powered, rechargeable battery powered, dimmer controlled, RF remote controlled versions, solar powered, and the like. As such, the specific method of interior illumination of the mirror 10 is not intended to be a limiting factor of the present invention.

2. Operation of the Preferred Embodiment

People of deep, whole-hearted religious faith live by and are inspired by the word of God and the Lord Jesus Christ. These people typically involve themselves in intensive study of the Bible and strive to follow its teachings. While these efforts often produce positive results where true happiness and content is realized, as mortals we inevitably venture off a desired spiritual path without constant reminders of our faith. Others may require more traditional messages or inspiration that is just not delivered by conventional prayer or spiritual poem. As believers in the Word of God, people are on the constant lookout for new and inspirational methods of presenting such reminders. Accordingly, there exists a need for a means by which inspirational messages and/or biblical verse reminders can be delivered in a new and exciting manner. The development of the engraved mirror with interior lighting 10 fulfills this need.

The preferred embodiment of the present invention can be utilized by the common user in a simple and effortless manner with little or no training. It is envisioned that the engraved mirror with interior lighting 10 would be constructed in general accordance with FIG. 1 through FIG. 5. The user would procure the engraved mirror with interior lighting 10 from conventional procurement channels such as department stores, discount stores, gift shops, mail order or internet supply houses or the like. Special attention would be paid to: the overall size of the mirror 10, method of illumination, color of illumination (as controlled by the colored film 95), and the content of the inscribed indicia 30.

After procurement and prior to utilization, the engraved mirror with interior lighting 10 would be prepared in the following manner: a suitable method of display would be chosen; either wall hanging or display on a horizontal surface and the plug 55 would be connected to a receptacle 60.

During utilization of the engraved mirror with interior lighting 10, the following procedure would be initiated: the in-line switch 65 would be activated to illuminate the interior of the mirror 10 causing illumination of the color of the colored film 95 to be emitted through the inscribed indicia 30 in the front mirror 15, the left side mirror 20 and the right side mirror 25. As the view reads or otherwise views the inscribed indicia 30, he or she is rewarded with an image of themselves in the mirrored surface. It is envisioned that such an image provides for self-reflection.

After use of the engraved mirror with interior lighting 10, it is deactivated by use of the in-line switch 65, making it ready for use as needed at a future point in time.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims:

The invention claimed is:

1. An engraved mirror, consisting of:
   a main front mirror provided with an inscribed indicia and a plurality of beveled edges, the main front mirror inscribed indicia is produced on a rear surface of the main front mirror;
   a left-side mirror provided with an inscribed indicia and a plurality of beveled edges, the left-side mirror inscribed indicia is produced on a rear surface of the left-side mirror;
   a right-side mirror provided with an inscribed indicia and a plurality of beveled edges, the right-side mirror inscribed indicia is produced on a rear surface of the right-side mirror;
   a top cap disposed on a top of the engraved mirror;
   a bottom cap disposed a bottom of the engraved mirror;
   a rear surface disposed on a rear of the engraved mirror;
   an in-line switch having an ON/OFF switch, the in-line switch is provided to control electrical power to the engraved mirror;
   a physical junction between the top cap and the rear surface, the bottom cap and the rear surface, the left side mirror and the rear surface, and the right-side mirror and the rear surface;
   an electric power cord and an electrical plug providing electrical power to the engraved mirror, the electric power cord exits through the rear surface to be minimally visually intrusive;
   a plurality of interior illumination is provided by a pair of LED light strips attached to the top cap and the bottom cap; and
   a colored film located adjacent to an interior of the left side mirror, an interior of the right-side mirror as well as an interior of the front mirror to allow for a colored appearance of the inscribed indicia;

wherein the main front mirror presents a smooth surface to the viewer that is easy to keep clean and free of dust;

wherein the left-side mirror presents a smooth surface to the viewer that is easy to keep clean and free of dust;

wherein the right-side mirror presents a smooth surface to the viewer that is easy to keep clean and free of dust;

wherein the electric power cord is transparent to be minimally visually intrusive;

wherein an outward facing surface of the rear surface is provided with a protective coating to provide an aesthetic ambiance the engraved mirror displays in a manner which allows viewing of the rear surface; and wherein an interior side of the rear surface is covered with a reflective coating to aid in light distribution from the pair of LED light strips about an interior of the engraved mirror.

2. The engraved mirror according to claim 1, wherein the main front mirror inscribed indicia are accomplished by a process selected from the group consisting of laser etching, chemical etching, or mechanical etching.

3. The engraved mirror according to claim 1, wherein the left-side mirror inscribed indicia are accomplished by a process selected from the group consisting of laser etching, chemical etching, or mechanical etching.

4. The engraved mirror according to claim 1, wherein the right-side mirror inscribed indicia are accomplished by a process selected from the group consisting of laser etching, chemical etching, or mechanical etching.

5. The engraved mirror according to claim 1, wherein the top cap is made of wood.

6. The engraved mirror according to claim 1, wherein the bottom cap is made of wood.

7. The engraved mirror according to claim 1, wherein the rear surface is made of wood.

8. The engraved mirror according to claim 1, wherein the rear surface is one-eighth-of-an-inch thick.

9. The engraved mirror according to claim 1, wherein the pair of LED light strips are electrically connected to each other via interconnecting electrical wiring as well as to a one-amp LED power supply.

10. The engraved mirror according to claim 9, wherein the one-amp LED power supply receives input power from the electric power cord.

11. The engraved mirror according to claim 1, wherein the engraved mirror is sixteen inches wide, sixteen inches tall, and two and three-quarters inches deep.

* * * * *